United States Patent [19]

Hoene et al.

[11] 4,126,739

[45] Nov. 21, 1978

[54] COPOLYMERS, HAVING A UNIFORM STRUCTURE, OF CYCLIC DIENES AND THEIR USE

[75] Inventors: Richard Hoene, Heidelberg; Heinz-Hilmar Bankowsky, Ludwigshafen; Eduard Hartmann, Limburgerhof; Hans-Uwe Schenck, Wachenheim; Paul Boerzel, Frankenthal, all of Fed. Rep. of Germany

[73] Assignee: BASF Aktiengesellschaft, Ludwigshafen, Fed. Rep. of Germany

[21] Appl. No.: 853,049

[22] Filed: Nov. 21, 1977

[30] Foreign Application Priority Data

Dec. 4, 1976 [DE] Fed. Rep. of Germany ....... 2655109

[51] Int. Cl.$^2$ .................... C08F 222/00; C08F 222/08
[52] U.S. Cl. ..................................... 526/272; 526/283; 526/317; 526/318
[58] Field of Search ................ 526/272, 283, 317, 318

[56] References Cited

U.S. PATENT DOCUMENTS

| 3,442,872 | 5/1969 | Korbanka et al. | 526/272 |
|---|---|---|---|
| 3,887,513 | 6/1975 | Fritze et al. | 526/272 |
| 3,890,285 | 6/1975 | Sumita et al. | 526/272 |

FOREIGN PATENT DOCUMENTS

| 486,942 | 3/1973 | Japan | 526/272 |
|---|---|---|---|
| 4,931,628 | 8/1974 | Japan | 526/272 |

*Primary Examiner*—John Kight, III
*Attorney, Agent, or Firm*—Keil, Thompson & Shurtleff

[57] ABSTRACT

Copolymers, having a uniform structure, of cyclic dienes are obtained by heating a mixture of from 35 to 96% by weight of cyclopentadiene, dicyclopentadiene and/or methyldicyclopentadiene, which may or may not be partially replaced by methylcyclopentadiene or tricyclopentadiene or methyltricyclopentadiene, from 1 to 30% by weight of maleic anhydride, maleic acid or a monoalkyl maleate, which maleic acid or maleic acid derivatives may be partially replaced by other $\alpha,\beta$-olefinically unsaturated monocarboxylic acids or dicarboxylic acids of 3 to 5 carbon atoms, and from 3 to 45% by weight of one or more vinyl-aromatics to 230°–320° C, during which heating the mixture does not remain at from 30° to 230° C for more than 5 hours, and preferably for not more than 2 hours. The copolymers may be used as binders for printing inks and coatings, and as additives in adhesives.

9 Claims, No Drawings

COPOLYMERS, HAVING A UNIFORM STRUCTURE, OF CYCLIC DIENES AND THEIR USE

The present invention relates to copolymers, having a uniform structure, of cyclic dienes, maleic acid or maleic anhydride and vinyl-aromatics, and to their use as binders for printing inks and coatings, and in adhesives.

The manufacture of hydrocarbon resins by polymerizing cyclopentadiene or dicyclopentadiene has been disclosed. It is true that these resins have disadvantages, because they tend to undergo autoxidation and release malodorous decomposition products, especially at elevated temperatures, but they can be used, for example, in road-marking compositions, fillers or carpet backings.

Less unsaturated cyclopentadiene copolymers, which in particular exhibit better stability to heat and oxidation, are obtained by copolymerization with vinyl-aromatics, especially styrene, for example by the process of German Laid-Open Applications DOS 2,163,525 or DOS 2,345,014.

All these hydrocarbon resins are unsuitable for the manufacture of high quality printing inks and pigmented surface coatings. Because of their non-polar character, they exhibit inadequate wetting of conventional pigments, for which reason, for example, the printing inks containing such resins exhibit poor adhesion, low tinctorial strength and poor gloss and have a tendency to bronzing and strike-through. Furthermore, these resins release solvent too slowly, which in particular makes them unsuitable for high quality toluene-based gravure printing inks.

It is known that resins modified with polar groups are obtained by subsequently reacting the hydrocarbon resins with, for example, maleic anhydride, but in that case there is frequently a danger of gelling. It is true that such resins offer somewhat improved pigment wetting and hardness, but the stability to heat, the release of solvent and the strike-through characteristics remain unsatisfactory. To eliminate these shortcomings, in particular, complicated multi-stage processes have frequently been carried out; for example, the resins have been modified with maleic anhydride and then subjected to a conventional (polyfunctional) esterification or salt formation, as claimed, for example, in German Laid-Open Applications DOS 2,356,324, 2,361,118 and 2,246,283.

Subsequent modification of the hydrocarbon resins, described in German Laid-Open Application DOS 2,163,525, with maleic anhydride also fails to give products which conform to the standards demanded of binders for high quality printing inks, since the modified products have too powerful an odor and undergo undesirable side reactions with the pigments.

According to the process of Japanese Patent Application 6942/1973, subsequent modification with maleic anhydride is avoided by reacting cyclopentadiene or dicyclopentadiene and maleic anhydride at elevated temperatures. If such resins contain little maleic anhydride, they exhibit poor pigment wetting and poor drying. If the proportion of maleic anhydride is higher, discoloration, contamination and, frequently, gelling of the batches is observed. Furthermore, the release of solvent from the resins is unsatisfactory.

German Laid-Open Application DOS 2,347,813 discloses a different method of manufacturing printing ink binders by modification of cyclopentadiene resins. According to this disclosure, graft copolymers are manufactured by copolymerizing maleic anhydride and styrene in the presence of a cyclopentadiene resin by means of a compound which forms free radicals. This reaction does not reduce the double bond content of the cyclopentadiene resins substantially, so that once again the heat stability is not entirely satisfactory. Above all, however, the formation of nongrafted, partially insoluble styrene/maleic anhydride copolymer cannot be excluded, and as a result the binders obtained have poor solubility, or give cloudy solutions, which then, for example, result in poor gloss.

It is known that, for example, maleic anhydride and styrene, on being heated in hydrocarbons, spontaneously form, even below 200° C., a copolymer which has an alternating structure and is insoluble in hydrocarbons (cf. R. B. Seymour, F. F. Harris and J. Branum, Ind. Eng. Chem. 41 (1949), 766). If, for example, a mixture of dicyclopentadiene, styrene and maleic anhydride is heated to 170° C., an insoluble copolymer precipitates within a few minutes; this copolymer contains equal parts of styrene and maleic anhydride and does not dissolve during the polymerization of the unconverted dicyclopentadiene, for example 290° C.

In the case of the graft polymerization, described in Example 1 of German Laid-Open Application DOS 2,347,813, of styrene and maleic anhydride onto a cyclopentadiene resin, the formation of a copolymer which has an alternating structure and is insoluble in hydrocarbons is unavoidable. Such graft polymers are resin mixtures which have a non-uniform structure and are in most cases incompletely soluble in toluene or in drying oils. Furthermore, the grafting reaction does not decrease the double bond content of the cyclopentadiene resins substantially, so that the heat stability and resistance to autoxidation of the resins are unsatisfactory.

It is an object of the present invention to provide copolymers, having a uniform structure, based on cyclic dienes, which do not suffer from the above disadvantages of the corresponding conventional products and can be used particularly advantageously as binders for high quality printing inks.

We have found that this object is achieved by providing copolymers, having a uniform structure, of cyclic dienes, which copolymers are obtained by heating a mixture of (A) from 35 to 96% by weight of cyclopentadiene, dicyclopentadiene and/or methyldicyclopentadiene, which may or may not be partially replaced by methylcyclopentadiene, tricyclopentadiene or methyltricyclopentadiene, (B) from 1 to 30% by weight of maleic anhydride, maleic acid or a monoalkyl maleate, which maleic acid or maleic acid derivatives may be partially replaced by other $\alpha,\beta$-olefinically unsaturated monocarboxylic acids or dicarboxylic acids of 3 to 5 carbon atoms or their anhydrides or monoalkyl esters, and (C) from 3 to 45% by weight of one or more vinyl aromatics, the sum of the percentages of (A), (B) and (C) amounting to 100, to 230°–320° C., during which heating the mixture does not remain at from 30° to 230° C. for more than 5 hours, and preferably not more than 2 hours.

Copolymers of this type, having a uniform structure, which possess melting points of from 80° to 300° C., iodine numbers of from 30 to 120 and molecular weights of from 400 to 2,000, and which are soluble in hydrocarbons and/or in natural drying oils, have proved particularly advantageous.

The present invention also relates to the use of the copolymers of the invention, having a uniform structure, as binders for printing inks and coatings, and as an additive in adhesives.

The terpolymers claimed, having a uniform structure, differ from the graft polymers disclosed in German Laid-Open Application DOS 2,347,813 in that in the course of their manufacture neither the toluene-insoluble or linseed oil-insoluble binary copolymers of (B) and (C), nor homopolymers of (A) or (C) which result in pigment incompatibility, are formed. It is surprising that if the reaction is induced in such a way that the mixture of the unconverted monomers A, B and C is kept at from 30° to 230° C., especially from 60° to 230° C., for not more than 5 hours, and preferably not more than 2 hours, products having such advantageous properties are obtained.

The copolymers according to the invention, having a uniform structure, are distinguished by the absence of odor, by hardness, by a light color and by high resistance to heat and to oxidation. Their performance characteristics can be varied within wide limits. High-melting resins are particularly obtained by polymerization at high temperatures, with long reaction times, high monomer concentrations and thorough removal of the volatile constituents of the resin.

Whilst such resins are particularly suitable for printing inks (and, in particular, the proportion of monomer (B) decides whether the resin is toluene-soluble or linseed oil-soluble) lower-melting copolymers are above all employed as tackifiers, in road-marking compositions and in surface-coating binders. These products are obtained by polymerization at lower temperatures (about 230°-290° C.), with short reaction times and low monomer concentrations, by less thorough degassing, or by using plasticizing comonomers, for example butadiene, isoprene and butyl acrylate.

The following may be noted in respect of the components from which the copolymers according to the invention are synthesized:

(A) According to the invention, component (A) is cyclopentadiene, dicyclopentadiene and/or methyldicyclopentadiene, of which compounds up to 50% by weight, based on (total) (A) may or may not be replaced by methylcyclopentadiene, tricyclopentadiene or methyltricyclopentadiene.

These monomers are often obtained in the $C_5$-fraction of the products formed on thermal decomposition of naphtha; mixtures which have been purified by fractionation and may or may not have been oligomerized as a rule contain from about 0.1 to 5% by weight of other saturated or unsaturated hydrocarbons, e.g. pentane, isoprene, piperylene or co-dimers of cyclopentadiene with conjugated diolefins, or other Diels-Alder reaction products formed by reaction between the monomers mentioned under (A).

According to the invention, it is preferred to employ such purified dicyclopentadienes, which may frequently still contain the monomers, or traces of higher oligomers.

The proportion of component (A) in the copolymer is from 35 to 96, preferably at least 50,% by weight.

(B) Suitable components (B) are maleic anhydride, maleic acid and monoalkyl maleates, where alkyl is of 1 to 18 carbon atoms; these compounds may be partially replaced, for example in amounts of up to 50% by weight, by other $\alpha,\beta$-olefinically unsaturated monocarboxylic acids or dicarboxylic acids of 3 to 5 carbon atoms, e.g. fumaric acid, itaconic acid, citraconic acid, acrylic acid, methacrylic acid or their anhydrides or esters or half-esters. Diels-Alder adducts of cyclopentadiene with the above olefinically unsaturated carboxylic acids or carboxylic acid derivatives, or their mixtures, may also be used to provide part of components (A) and (B) simultaneously. According to the invention, maleic anhydride is preferred. The proportion of (B) in the total amount of monomers is from 1 to 30% by weight, preferably from 3 to 25% by weight. If the amount exceeds 30% by weight, the acid number of the terpolymer becomes too high and reactions with the pigment may occur in the printing ink; if the amount is less than 1% by weight, the pigments are not wetted adequately and the gloss of the inks is insufficient.

(C) The vinyl-aromatics which according to the invention are used in amounts of from 3 to 45% by weight, based on monomers, include styrene, $\alpha$-methylstyrene, o- and p-vinyltoluene, ethylstyrene, propylstyrene, isopropylstyrene, isobutylstyrene, tert.-butylstyrene, stilbene, indene, o- and p-chlorostyrene and mixtures of these monomers; styrene is particularly preferred. If the proportion of the vinyl-aromatics is less than 3% by weight, the color and stability show no improvement over those of the binary copolymers of (A) and (B); if the proportion exceeds 45% by weight, copolymers which do not have a uniform structure and which contain polystyrene may be formed.

The copolymerization reaction is carried out at from about 230° to 320° C., preferably from 250° to 300° C., suitably under pressures of from 3 to 30 bars; the heating-up time is kept very short. The reaction times are from a few minutes to several hours. The polymerization temperature in particular essentially influences the color, melting point, molecular weight and solubility of the copolymers. Whilst at lower temperatures, in particular below 200° C., partially insoluble and incompletely polymerized mixtures are obtained, very high-melting resins, which cannot be processed further, may be obtained above 320° C.

The following embodiments of the process may be used to obtain the copolymers according to the invention, having a uniform structure:

1. The mixture of the monomers (A), (B) and (C) is heated in the course of at most 5 hours to the reaction temperature, which is from 230° to 320° C. At times, especially with fairly high proportions of (B) and (C), it is advisable to speed up the heating process. Under certain circumstances it may be necessary to heat up the monomer mixture in the course of minutes or even seconds. This process can also be used with advantage for the continuous manufacture of the copolymers.

2. (A) and (C) are mixed and (B) is added in the course of heating, not later than just before the polymerization reaction starts, for example at from 150° to 230° C.

3. (A) and (B) are mixed and (C) is added not later than just before the start of the polymerization reaction.

The copolymerization can be carried out in the presence or absence of solvents. Suitable solvents are aromatics, e.g. benzene, toluene, xylenes, chlorobenzene, ethylbenzene and cumene, aliphatics, e.g. cyclohexane and gasolines with various boiling ranges, ethers, e.g. dioxane and ethylene glycol dimethyl ether, and chlorinated hydrocarbons, e.g. chloroform and carbon tetrachloride. The polymerization can be carried out in the absence or presence of initiators. Examples of suitable initiators are peroxides, e.g. dibenzoyl peroxide and di-t-butyl peroxide, peresters, e.g. t-butyl perbenzoate, hydroperoxides, e.g. cumene hydroperoxide, azo compounds and initiators having labile carbon-carbon bonds.

The copolymers according to the invention in general have melting points or softening points of from 80° to 300° C., preferably from 100° to 270° C., iodine numbers of from 30 to 120, and molecular weights of from 400 to 2,000. They are very resistant to heat exposure and to autoxidation, which is an advantage during working-up, during storage and during use of the resins as printing ink binders. Furthermore, the copolymers are light in color and can therefore also be used, for example, as tackifiers in pressure-sensitive adhesives, hot-melt adhesives or rubber.

After polymerization, the copolymers can be processed by conventional methods. Such processing includes mixing or reaction with phenols, phenolic resins, hydrocarbon resins, rosin esters, resinates, drying oils, paraffin oils, alkyd resins, maleic anhydride and mercaptans. The acid, ester or anhydride groups present in the monomers B or in the copolymers can undergo (partial) monofunctional or polyfunctional reactions by conventional processes, for example with aliphatic, cycloaliphatic or aromatic monofunctional and/or polyfunctional alcohols, e.g. methanol, ethanol, propanol, n-butanol, isobutanol, ethylhexyl alcohol, dodecyl alcohol, cyclohexanol, benzyl alcohol, ethylene glycol, glycerol, pentaerythritol, neopentylglycol and trihydroxymethylpropane, with ammonia, with amines and with compounds of metals of groups I and II of the periodic table.

The copolymers according to the invention can in particular be used as binders for printing inks. Copolymers which contain less that 10% by weight of the monomers (B) are mostly suitable for the manufacture of relief-printing varnishes, based, for example, on drying oils, which are superior in gloss and color to the conventional hydrocarbons.

A resin which is soluble in natural drying oils or in mineral oils is obtained, for example, by using about 5% of maleic anhydride.

Because of their good pigment wetting, their high softening point and their rapid release of solvent, the copolymers can be used for the manufacture of high quality toluene-based gravure printing inks. In this respect they are distinctly superior to the conventional hydrocarbon resins. When ground with blue pigments, in particular, they surpass even the phenol/rosin resins which have hitherto been preferred. Further possible uses of the copolymers are to be found in the manufacture of coating compositions, e.g. paints, in road-marking paints and in the modification of fillers and sealants, including, in particular, their use as tackifiers.

The characteristic data of the products, given in the Examples which follow, are determined as described below.

Iodine number: catalytic hydrogenation over a platinum catalyst in tetrahydrofuran; the equivalent amount of iodine in mg/100 mg of substance is recorded.

Softening point: this is determined either by the Krämer/Sarnow/Nagel method (DIN 53,180) or by means of a Kofler heating bench. The temperature of the heated stage at which the resin sample begins to stick to the plate is recorded.

Molecular weight: this is determined by vapor pressure osmometry in benzene by the method of Elias, Makromoleküle, Huthig und Wepf Verlag 1971, pages 229–238.

Cup flow time: the flow time, in a DIN 4 cup, of a 35% strength resin solution in toluene at 20° C. (DIN 53,211).

Acid number: method as described in DIN 53,402; recorded in mg of KOH/g of substance.

In the Examples, parts and percentages are by weight, unless stated otherwise. Parts by volume bear the same relation to parts by weight as that of the kilogram to the liter.

EXAMPLE 1

1.6 parts of dicyclopentadiene, 0.18 part of maleic anhydride and 1.2 parts of a hydrocarbon mixture which consists of 8.4% of benzene, 22% of toluene, 1.5% of conjugated dienes, 15% of xylenes, 7.6% of styrene, 5% of methylstyrenes, 2.6% of indene and 37.9% of other hydrocarbons which are essentially free from olefinic double bonds are introduced, whilst stirring, into a pressure vessel having a capacity of 10 parts by volume, and the system is flushed with nitrogen. The batch is heated to 300° C. in the course of 1 hour and is kept at this temperature for 1 hour. The reaction mixture which has a solids content of 72.4%, is degassed at 210° C. by reducing the pressure to 50 mbar, and is discharged as a yellowish melt. The cup flow time is 13 sec., the molecular weight is 1,020 and the iodine number is 55. The softening point (DIN 53,180) is 222° C.

EXAMPLE 2

A mixture of 1.8 parts of dicyclopentadiene, 0.3 part of maleic anhydride, 0.225 part of styrene and 0.675 part of xylene is heated, as described in Example 1, to 290° C. in the course of 40 minutes, and kept at this temperature for 1 hour. The reaction mixture is degassed at 230° C. down to 2 mbar. A pale-colored resin melt is obtained. The cup flow time of the resin is 12 sec., the softening point (heated stage) is 212° C. and the molecular weight is 790.

EXAMPLE 3

A mixture of 6.9 parts of dicyclopentadiene, 525 parts of styrene, 0.6 part of a mixture of 95% of maleic anhydride and 5% citraconic anhydride and 3.75 parts of xylene, contained in a stirred autoclave of 40 parts by volume capacity, is flushed with nitrogen, heated to 275° C. in the course of 55 minutes, kept at this temperature for 1 hour, then degassed at 230° C. down to 800 mbar in the course of 45 minutes, and discharged as a colorless melt. The cup flow time of the resin is 10.5 sec. and the softening point (heated stage) is 207° C.

EXAMPLE 4 AND COMPARATIVE EXAMPLE 81.8 parts of dicyclopentadiene, 36.4 parts of maleic anhydride, 36.4 parts of styrene and 45.5 parts of toluene, contained in a pressure vessel, are flushed with nitrogen, heated to 270° C. in the course of 15 min. and kept at 270° to 290° C. for 1 hour. 40 parts of solvent are then stripped off under reduced pressure at 240° C. The resin, which is almost colorless, has a softening point (DIN 53,180) of 153° C., an iodine number of 57 and a molecular weight of 690.

If the procedure described in Example 4 is followed, but instead of the styrene an additional 36.4 parts of dicyclopentadiene are employed, the amount of the volatile constituents is 43 parts and a deep brown resin is obtained, which has a softening point (DIN 53,180) of 96° C., an iodine number of 80 and a molecular weight of 530.

It follows from these two experiments that as a result of the copolymerization of styrene in accordance with the invention, the resin obtained has a paler color, a higher softening point, a lower iodine number and a higher molecular weight than the binary copolymer of dicyclopentadiene and maleic anhydride.

EXAMPLE 5

1.52 parts of dicyclopentadiene, 0.1 part of styrene and 0.5 part of xylene, contained in a stirred autoclave of 5 parts by volume capacity, are thoroughly flushed with nitrogen and heated to 150° C. in the course of 90 minutes. 0.08 part of maleic anhydride is added immediately and the mixture is heated to 280° C. in the course of 70 minutes and kept at this temperature for 2 hours. It is then cooled to 230° C. and 0.48 part of solvent is stripped off under reduced pressure. The amber-colored resin has a softening point (heated stage) of 195° C., an iodine number of 69 and an acid number of 26.

EXAMPLE 6

Following the procedure described in Example 1, 1.68 parts of dicyclopentadiene, 0.21 part of maleic anhydride, 0.3 part of 2-ethylhexanol, 0.04 part of xylene and 0.15 part of styrene, contained in a stirred autoclave of 10 parts by volume capacity, are reacted at 290° C. and then modified with 0.09 part of linseed oil. After degassing at 230° C., an almost colorless resin having a softening point (DIN 53,180) of 162° C., and a molecular weight of 1,220 is obtained.

EXAMPLE 7

The polymerization reaction described in Example 5 is carried out, but after the mixture has cooled to 230° C. a further 0.3 part of maleic anhydride is added and the mixture is allowed to react for 2 hours. The pressure is then let down at 230° C. The yellow resin has a cup flow time of 15 sec., an acid number of 110.1, an iodine number of 42, a softening point (heated stage) of 265° C. and a molecular weight of 920.

EXAMPLE 8

1 mixture of 200 parts of 2-ethylhexanol, 1,680 parts of dicyclopentadiene, 210 parts of maleic anhydride and 900 parts of the hydrocarbon mixture mentioned in Example 1, is brought to 290° C. in the course of 30 min., kept at this temperature for 10 min., reacted with 210 parts of linseed oil for 5 min. and degassed at 210° C. down to 2 mbar. The resin has a cup flow time of 11.1 sec., a softening point (DIN 53,180) of 76° C., an iodine number of 88 and a molecular weight of 680.

COMPARATIVE EXPERIMENTS 1–6

Mixture I (10 parts of styrene, 80 parts of dicyclopentadiene, 10 parts of maleic anhydride and 25 parts of xylene) or mixture II (starting materials as in I, except without styrene), contained in an autoclave, is thoroughly flushed with nitrogen and reacted in accordance with different temperature programs. After cooling, reaction mixtures differing in appearance are obtained.

| Experiment | Mixture | Temperature program | Appearance |
|---|---|---|---|
| 1 | I | Heat to 170° in the course of 2 hours, then as for experiment 2 | Light brown solution containing 15 parts of insoluble solids. |
| 2 | I | Heat to 200° in the course of 2 hours, then as for Experiment 2 | As in Experiment 3 |
| 3 | I | Heat to 210° in the course of 30 minutes and keep at this temperature for 2 hours | Colorless liquid containing 6 parts of insoluble solids |
| 4 | II | As for Experiment 5 | Colorless liquid with waxy constituents |
| 5 | I | Continue Experiment 5; keep for 1 hour at 290° | Pale, viscous solution containing 10 parts of insoluble solids |
| 6 | II | Continue Experiment 6 as for Experiment 7 | Pale brown, clear solution |
| (According to the invention) | I | Heat to 230° in the course of 2 hours, then to 250° in the course of 15 minutes, and keep at 250° for 1 hour | Clear, slightly viscous, almost colorless solution |
| (According to the invention) | I | Heat to 170° in the course of 1 hour, then to 290° in the course of 1 hour, and keep at 290° for 1 hour | Clear, yellowish, viscous solution |

It follows from these Comparative Experiments that the copolymerization of dicyclopentadiene and styrene at 210° is incomplete and results in a partially waxy product, which however reacts with unconverted monomer at 290° to give a soluble polymer. In contrast, the reaction, at 210°, of the mixture which additionally contains maleic anhydride leads to an insoluble solid, which persists even after the polymerization at 290°. Only if the monomer mixture is heated to 230° in the course of at most 2 hours, is a partially insoluble copolymer not obtained.

Use in printing inks (a) Toluene-based gravure printing inks:

To prepare a toluene-based gravure printing ink, a 35% strength solution of the resins in toluene is prepared. 90 parts of this solution and 10 parts of C.I. Pigment Blue Part Two: 74160- C.I. Part One: 15 : 3 are ground in a laboratory shaker in the presence of steel balls and, where required, the inks are brought to 20 seconds cup flow time by means of toluene. For comparison, an ink is ground using a rosin modified with phenolic resin.

The dispersion hardness, expressed in %, denotes the relative increase in tinctorial strength (determined by visual comparison with a standard) after 5 and 30 minutes' grinding. 25% corresponds to excellent dispersing characteristics, 50% to average characteristics and 100% to poor characteristics. The gloss of the ink is determined on gravure printing paper by spreading a 20μm film of the ink with a knife-coater and drying the film. A Gardner gloss tester is used; the angle of measurement is 60°. Flocculation is assessed visually by allowing the ink to run off a glass plate. 1 denotes very pronounced flocculation and 5 denotes no flocculation.

The print tests were carried out on a "Rototest" laboratory printing machine from Moser, using gravure printing paper and a full-shade roller. The drying speed is expressed in terms of the maximum possible printing speed, i.e. the speed of revolution of the printing roller at which the prints just fail to stick to one another.

parallel to the adhesive layer, at the rate of 300 mm/min. The force required to do this is measured.

The Table which follows illustrates the usefulness, as tackifiers, of the copolymers described in Examples 3 and 7.

| Polymer | Example No. | Compatibility | Peel strength [N] | Shear strength [hrs.] | Tack |
|---|---|---|---|---|---|
| Ethylene/vinyl acetate | — | — | — | — | Tack-free |
| " | 3 | Good | 9.7 | >72 | Good |
| " | 7 | Very good | 12.5 | >72 | Very good |
| Ethylene/methyl acrylate | — | — | — | — | Tack-free |
| " | 3 | Very good | 8.7 | >72 | Good |
| " | 7 | Very good | 8.6 | >72 | Very good |
| Styrene/butadiene | — | — | — | — | Tack-free |
| " | 3 | Good | 7.7 | 72 | Good |

The results are to be found in the Table which follows.

| Example No. | 1 | 2 | 4 | 5 | 7 | Comparison (resin modified with phenolic resin) |
|---|---|---|---|---|---|---|
| Dispersion hardness % | 23 | 33 | 25 | 21 | 11 | 25 |
| Pigment distribution | 5 | 5 | 5 | 5 | 5 | 4 |
| Gloss (%) | 39 | 39 | 58 | 35 | 40 | 35 |
| Flocculation | 5 | 5 | 4–5 | 4 | 5 | 4 |
| Drying speed (rpm) | 2,600 | 2,800 | 2,700 | 2,400 | 3,000 | 2,400 |

It may be seen from these results that the copolymers according to the invention, for example when they contain more than 4% by weight of maleic anhydride, are superior to a conventional phenol-modified rosin as a binder for toluene-based gravure printing inks.

(b) Relief printing inks

To prepare relief printing inks, a 40% strength solution of the resins in linseed oil is prepared at 200°–240° C. 80 parts of the varnish and 10 parts of C.I. Pigment red 57 : 1, 15,840 are ground on a triple roll mill to a fineness of less than 2.5μm. The inks are prepared in comparison with a conventional relief printing test varnish and are tested on an FAG proof press, using an iris print.

Result: the resins described in Examples 5 and 6 give inks which print entirely satisfactorily and which, without any further compounding, are superior in gloss and scratch resistance to the comparison varnish.

Use as tackifiers in pressure-sensitive adhesives

The test is carried out as follows: the resins are dissolved in toluene and the solutions are mixed with adhesive solution in a ratio (expressed as solids) of 1:1. The compatibility after drying, in the solvent-free state, is determined. To determine the tack, 2 cm wide polyester film strips coated with 25μm of the dried mixture are glued to metal plates. The shear strength is determined by suspending the metal plate vertically and applying a load of 1 kg to the overhanging end of the film strip; the glued area is 20 × 35 mm. The time required for the adhesive bond to break is measured. When measuring the peel strength, the test strips are pulled off backward, COMPARATIVE EXPERIMENT IN RELATION TO GERMAN LAID-OPEN APPLICATION DOS 2,347,813: (COMPARATIVE EXPERIMENT 7)

Preparation of a dicyclopentadiene resin A 10.5 parts of dicyclopentadiene and 4.5 parts of xylene in a pressure vessel are heated to 260° C. whilst stirring and are reacted for 2 hours at this temperature. The mixture is then cooled to 230° C. and the volatile constituents are distilled off, finally under reduced pressure at 500 mbar. The pale, toluenesoluble resin has a softening point (heated stage) of 92° C., a molecular weight of 390 and an iodine number of 90.

Following the procedure of Example 1 of German Laid-Open Application DOS 2,347,813 400 g of resin A and 100 g of tetrahydronaphthalene are heated to 180°, whilst stirring; 16 g of maleic anhydride, 20 g of styrene and 0.8 g of t-butyl peroxide are added in the course of 30 min. The mixture is allowed to react for a further 30 min. and the volatile constituents are stripped off, finally at 220° C. and under reduced pressure, viz. 1 mbar.

This graft polymer does not give a clear solution in linseed oil even at 240° C.; the product contains about 10% of linseed oil-insoluble constituents. The 35% strength solution of this graft polymer in toluene is flocculent and cloudy; both varnishes give matt resin films. Hence, the graft polymer is unsuitable for use in linseed oil-soluble or toluene-soluble printing inks.

COMPARATIVE EXPERIMENT 8

Graft polymerization

The procedure followed is as described in the preceding Comparative Experiment except that 80 g of maleic anhydride, 80 g of styrene and 0.8 g of di-tert.-butyl peroxide are added. A cloudy resin is obtained, which is partially insoluble in toluene and is therefore unsuitable for the preparation of toluene-based printing inks.

The copolymers according according to the invention, having a uniform structure, are thus superior to the graft polymers of the same overall composition, prepared according to German Laid-Open Application DOS 2,347,813, in particular as far as use in printing ink binders is concerned.

We claim:

1. Copolymers, having a uniform structure, of cyclic dienes, which copolymers have been obtained by heating a mixture of
   (A) from 35 to 96% by weight of one or more compounds selected from the group comprising cyclopentadiene, dicyclopentadiene, methyldicyclopentadiene, methylcyclopentadiene, tricyclopentadiene and methyltricyclopentadiene, (B) from 1 to 30% by weight of maleic anhydride, maleic acid or a monoalkyl maleate and (C) from 3 to 45% by weight of one or more vinylaromatics, the sum of the percentages of (A), (B) and (C) amounting to 100, to 230°–320° C., in the course of which heating the mixture does not remain for more than 5 hours at from 30° to 230° C.

2. Copolymers, having a uniform structure, as claimed in claim 1, wherein the maleic acid or maleic acid derivative of component (B) is partially replaced by other α,β-olefinically unsaturated monocarboxylic acids or dicarboxylic acids of 3 to 5 carbon atoms.

3. Copolymers, having a uniform structure, as claimed in claim 1, wherein component (C) is styrene.

4. Copolymers, having a uniform structure, as claimed in claim 2, wherein component (C) is styrene.

5. Copolymers, having a uniform structure, as claimed in claim 1, wherein the mixture of (A), (B) and (C), on heating to 230°–320° C., does not remain for more than 2 hours at from 30° to 230° C.

6. Copolymers, having a uniform structure, as claimed in claim 1, which have melting points of from 80° to 300° C. and iodine numbers of from 30 to 120.

7. Copolymers, having a uniform structure, as claimed in claim 2, which have melting points of from 80° to 300° C. and iodine numbers of from 30 to 120.

8. Copolymers, having a uniform structure, as claimed in claim 1, which have molecular weights of from 400 to 2,000 and are soluble in hydrocarbons and/or in natural drying oils.

9. Copolymers, having a uniform structure, as claimed in claim 2, which have molecular weights of from 400 to 2,000 and are soluble in hydrocarbons and/or in natural drying oils.

* * * * *

UNITED STATES PATENT AND TRADEMARK OFFICE
CERTIFICATE OF CORRECTION

PATENT NO. : 4,126,739
DATED : NOVEMBER 21, 1978
INVENTOR(S) : RICHARD HOENE ET AL

It is certified that error appears in the above-identified patent and that said Letters Patent are hereby corrected as shown below:

Columns 7 and 8, lines 18--36: under Experiment
first occurrence
"(According to
the invention)"   should read   -- 1 (According to the invention) --
second occurrence
"(According to
the invention)"   should read   -- 2 (According to the invention) --

"1"        should read  -- 3 --
    "2"        should read  -- 4 --
    "3"        should read  -- 5 --
    "4"        should read  -- 6 --
    "5"        should read  -- 7 --
    "6"        should read  -- 8 --

Signed and Sealed this

Twelfth Day of June 1979

[SEAL]

Attest:

RUTH C. MASON
*Attesting Officer*

DONALD W. BANNER
*Commissioner of Patents and Trademarks*